310-369 SR

XR 3,560,772

United States Patent

[11] 3,560,772

[72] Inventors Antonio Lungo
Middleburg Heights;
Gordon J. Conley, Macedonia, Ohio
[21] Appl. No. 856,265
[22] Filed Sept. 9, 1969
[45] Patented Feb. 2, 1971
[73] Assignee Clevite Corporation
Cleveland, Ohio
a corporation of Ohio

[54] PIEZOELECTRIC CRYSTAL MOUNTING EMPLOYING RESILIENT PARTIALLY CONDUCTIVE SUPPORT PADS
5 Claims, 4 Drawing Figs.

[52] U.S. Cl. .......... 310/9.4, 310/8.9, 310/9.6, 310/9.8, 333/72
[51] Int. Cl. .......... H01v 7/00
[50] Field of Search .......... 310/8.9, 9.1—9.4, 9.6—9.8; 333/72

[56] References Cited
UNITED STATES PATENTS

| | | | |
|---|---|---|---|
| 2,814,741 | 11/1957 | Minnich et al. | 310/9.4X |
| 2,842,687 | 7/1958 | Van Dyke | 310/9.1 |
| 3,113,223 | 12/1963 | Smith | 310/9.1 |
| 3,423,700 | 1/1969 | Curran et al. | 310/9.1 |
| 3,495,103 | 2/1970 | Nakajima et al. | 310/9.1 |

*Primary Examiner*—D.F. Duggan
*Assistant Examiner*—Mark O. Budd
*Attorney*—Eber J. Hyde

ABSTRACT: There is provided a novel mounting means for a piezoelectric resonator within a filter assembly, said mounting means comprise a conductor backing support on both sides of the resonator element connected thereto by means of wedge-shaped resilient pads secured on said conductor backing, each pad having a first conductive part resting on the electrode means of said resonator to effect electrical contact, and a second nonconductive part for support, thereby minimizing spurious and mechanical resonances, variations in bandwidths, and insertion losses.

PATENTED FEB 2 1971

3,560,772

INVENTORS
ANTONIO LUNGO
GORDON J. CONLEY

BY

Eber J. Hyde
ATTORNEY

PIEZOELECTRIC CRYSTAL MOUNTING EMPLOYING RESILIENT PARTIALLY CONDUCTIVE SUPPORT PADS

The present invention relates to an improved filter assembly utilizing a piezoelectric resonator element. More specifically, the invention is concerned with means for mounting and supporting said resonator element within said filter assembly during operation thereof.

The typical resonator element in low frequency filters comprises a simple quartz bar or a piezoelectric ceramic element, each provided with electrodes which, when connected to the electrical circuit, enable the resonator to be excited electromechanically in its principal vibratory mode.

With the advent of miniaturization and the expanded fields of applications of low frequency filters it is necessary that the filter assembly or package be small and the resonator element be mounted in a manner affording least mechanical restraint during operation. In the past, compliant spring wires welded to the resonator element and bulky insulating bodies comprised the main supporting and mounting means for resonator elements While said spring wires provided somewhat acceptable support for certain applications, they are presently inadequate and deficient for many uses. For example, in mountings of this type it is rather difficult to detect any flaw or malfunction in the resonator element prior to welding operation even though the element has passed inspection. The reason for this is the fact that normal inspections and quality controls do not detect small flaws in the resonator element, said flaws being greatly enhanced only after the wires are soldered or welded to the element. Also, it is believed that changes of the mechanical loading of the spring wire support with changes of the resonator's frequency gives rise to uncontrollable variations in insertion loss and bandwidth, in addition to spurious responses.

It is a principal object of the present invention to provide an improved filter assembly utilizing a piezoelectric resonator which is supported by mounting means capable of substantially reducing spurious responses and microphonic vibrations, variations in insertion loss and bandwidth.

Another object of the invention is to provide a low cost filter assembly and mounting means therefor.

A further object is to provide a filter assembly suitable for mass production and operable over a wide range of temperatures.

Other objects and advantages of the invention will become more apparent from the following description taken in conjunction with the accompanying drawings wherein.

Figure 2:
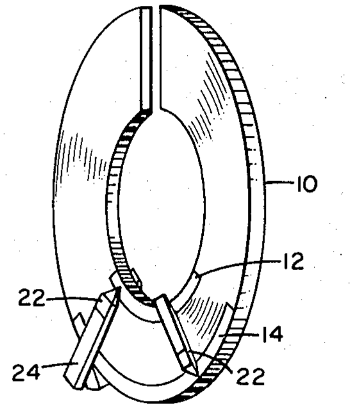
FIG. 2 is a perspective view illustrating the position of a part of the mounting means.
Figure 1:
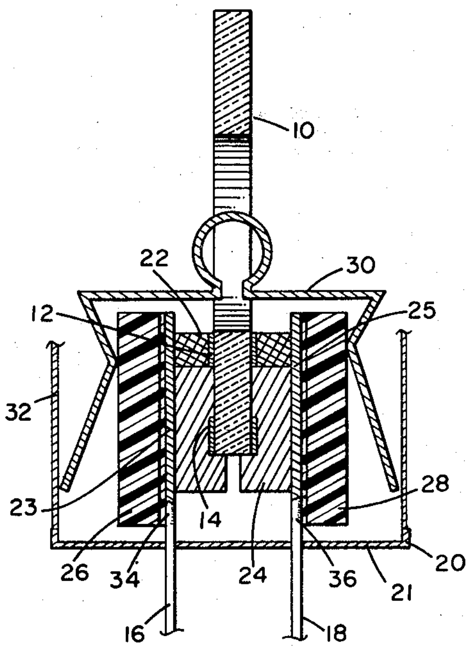
FIG. 1 is a longitudinal section of the filter assembly with the top cover partially removed.
Figure 4:
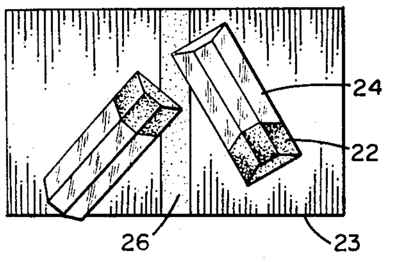

Referring specifically to FIG. 1, there is shown a longitudinal bisection of the filter assembly having a resonator element identified by the reference numeral 10. The resonator element can be a piezoelectric ceramic element or a quartz bar. Resonator 10, as shown in FIG. 2, is, however, a split ring resonator which is provided with a predetermined electrode configuration on opposite surfaces thereof, said configuration comprises aligned inner and outer arcuate electrode segments 12 and 14, respectively, on opposite surfaces of element 10.

Resonator 10 is preferably fabricated from piezoelectric ceramic compositions comprising lead zirconate-lead titanate, as disclosed in U.S. Pat. Nos. 3,006,857 and 3,179,594, both assigned to the same assignee of the present invention. Of course, other compositions may be equally used.

Figure 3:
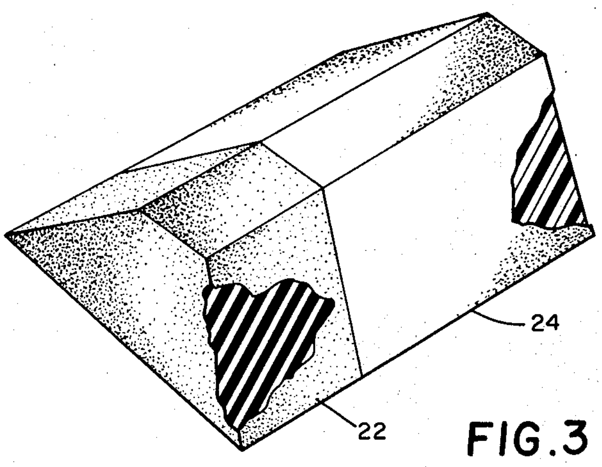
FIGS. 3 and 4 are enlarged illustrations of the structure of the mounting means.

Resonator 10 is supported by an assembly comprising a base or a header 21 of insulating material such as glass. Base 21 is provided with a moat 20 to enable the cover 32 partially shown, to slidably fit over the entire assembly. Depending on the intended use, the cover may provide an hermetically-sealed casing. To facilitate electrical connection, lead wires 16 and 18 (only two of four are shown) extend through base 21 and are connected, such as by soldering, to conductor backings 23 and 25, at points 34 and 36, respectively. Conductor backings 23 and 25 are firmly secured to insulators 26 and 28, respectively, providing rigidity and stability. In practice, conductor backing 23 and insulator 26 are the metal conductor and laminate, respectively, of a printed circuit board. Thus, the conductor may be copper foil or nickel foil and the laminate any insulating material suitable for such use. For ease of description, conductors 23 and 25 and laminates 26 and 28 will be referred to as circuit board supports. Resonator 10 is held between an oppositely disposed pair of said circuit board supports, to each of which is secured a pair of wedge-shaped resilient pads consisting of a conductive portion 22 and a nonconductive portion 24 integrally connected as shown in FIG. 3.

Resilient pads are secured to circuit board supports by means of a suitable adhesive. The pads are made of silicone rubber. The conductive portion 22 is preferably made of conducting silicone rubber, such as CHO—SEAL No. 1215 made by Chomerics, Inc., whereas nonconductive portion 24, which is intimately connected to conductive portion 22, is preferably made of a shock-absorbing, translucent resin such as SYLGARD No. 188 made by Dow Corning.

The resilient support pads are mounted on circuit board supports so that the conductive portion 22 of each pad rests on the respective electrode of resonator 10 at or near the nodal points. Viewed on one side, the nodal points of a split ring ceramic resonator swing through an arc located between the electrodes 12 and 14 as the resonator's frequency is shifted. The center of the arc and the center of the resonator element are concentric so locations of the contact points on the resonator are formed by intersection of the electrode with a line through the center of the resonator and the nodal point. Four locations are thus formed on each side of the resonator element. Only two of these locations, one to each electrode segment, are required on each side for mounting and electrical contact. The mounting locations on both sides do not have to be placed opposite each other.

The resilient pads are wedge-shaped with the narrow part resting on the electrode to reduce damping. The wedge-shaped has been found to increase structural stability.

To assure that the circuit board supports are held in place, it is preferable that they be held by a spring clip means 30 whose compressional force is maintained by cover 32.

The mounting and supporting features thus described provide an excellent filter assembly or package in which the resonator is permitted to vibrate freely without spurious responses and microphonic vibrations. Of significance is the fact that very low mechanical loading is observed, which indicates good correlation of bandwidth, insertion loss, and center frequency between a test holder mounting and the final assembly. In fact, no mechanical resonance is indicated between 10 Hz to 2,000 Hz.

The mounting means of the present invention show no detectable influence on the temperature dependency of the center frequency from −55° C. to +85° C. Center frequency shifts are very low, i.e., 10 Hz being maximum compared to prior art mounting having typical central frequency shifts of 100 Hz. Typical frequencies of the filter assembly range between 5 to 60 kHz.

It is to be understood that the present invention is not limited to the precise construction, as herein described and illustrated, but embraces all such variations and modifications as set forth in the following claims.

We claim:

1. In a filter assembly having an insulating base and a cover to define a sealed casing, a piezoelectric resonator having electrode means on opposite face surfaces thereof, electrical leads extending through said insulating base, and mounting means for each surface of said resonator comprising in combination a support member having a conductive surface and an insulative backing, said conductive surface being connected to and supported by said electrical leads and having secured thereon at least a pair of resilient pads, each pad having a first conductive part connecting said conductive surface to the electrode means of said resonator and a nonconductive part for additional support.

2. Mounting means for a piezoelectric resonator in a filter assembly as described in claim 1 wherein said support members are held by spring means.

3. Mounting means for a piezoelectric resonator in a filter assembly as described in claim 1 wherein said resilient pads are made of silicone rubber.

4. Mounting means for a piezoelectric resonator in a filter assembly as described in claim 1 wherein said support member is made of a printed circuit board.

5. Mounting means of a piezoelectric resonator in a filter assembly as described in claim 2 wherein the resilient pads are wedge-shaped with the narrow edge contacting said electrode means.